United States Patent
Velde

(10) Patent No.: US 7,518,753 B2
(45) Date of Patent: Apr. 14, 2009

(54) FULL CONTROL MULTILEVEL ERROR DIFFUSION

(75) Inventor: Koen Vande Velde, Duffel (BE)

(73) Assignee: Agfa Graphics NV, Mortsel (BE)

( * ) Notice: Subject to any disclaimer, the term of this patent is extended or adjusted under 35 U.S.C. 154(b) by 700 days.

(21) Appl. No.: 11/133,994

(22) Filed: May 20, 2005

(65) Prior Publication Data

US 2005/0270583 A1    Dec. 8, 2005

Related U.S. Application Data

(60) Provisional application No. 60/572,834, filed on May 20, 2004.

(51) Int. Cl.
*G06K 15/00* (2006.01)

(52) U.S. Cl. ............. 358/3.03; 358/3.02; 358/3.04; 358/1.9; 382/162; 347/15; 400/76

(58) Field of Classification Search ............ 400/76; 347/15; 358/3.02–3.04, 1.9
See application file for complete search history.

(56) References Cited

U.S. PATENT DOCUMENTS

| | | | |
|---|---|---|---|
| 4,680,645 A | 7/1987 | Dispoto | |
| 5,805,178 A | 9/1998 | Silverbrook | |
| 5,963,714 A | 10/1999 | Bhattacharjya | |
| 5,975,671 A * | 11/1999 | Spaulding et al. | 347/15 |
| 6,109,720 A | 8/2000 | Gotoh | |
| 6,439,682 B1 * | 8/2002 | Kakutani | 347/15 |
| 6,637,851 B2 | 10/2003 | Velde | |
| 7,023,578 B2 * | 4/2006 | Hayes et al. | 358/1.9 |
| 7,125,091 B2 * | 10/2006 | Huang et al. | 347/15 |
| 7,298,525 B2 * | 11/2007 | Hagai et al. | 358/1.9 |
| 7,362,472 B2 * | 4/2008 | Couwenhoven et al. | 358/3.03 |
| 2002/0051151 A1 | 5/2002 | Ohshima | |
| 2002/0181987 A1 * | 12/2002 | Kakutani | 400/76 |
| 2003/0021470 A1 | 1/2003 | Kakutani | |

* cited by examiner

*Primary Examiner*—Mark K Zimmerman
*Assistant Examiner*—Dung D Tran
(74) *Attorney, Agent, or Firm*—Keating & Bennett, LLP

(57) ABSTRACT

A method for processing a digitized continuous tone image for reproducing the image by a printing device, including (a) inputting a tone value of an input pixel of the image; (b) applying a plurality of levelsplit curves to the tone value, thus obtaining a plurality of level values, wherein each specific levelsplit curve of the curves corresponds to a level defined by (i) a combination of a dot density and a dot area; or (ii) an overlap of a plurality of such combinations; (c) inputting the plurality of level values to an error diffuser for obtaining an output pixel value for reproducing the image; wherein a fraction of the output pixels to be filled by an overlap of levels depends on the level values and is independent of the error diffuser.

11 Claims, 2 Drawing Sheets

FULL CONTROL MULTILEVEL ERROR DIFFUSION

This application claims the benefit of U.S. Provisional Application No. 60/572,834 filed on May 20, 2004.

FIELD OF THE INVENTION

The present invention relates to the halftoning of continuous tone images for use in reproduction of such images.

BACKGROUND OF THE INVENTION

To print a continuous tone image, customarily a halftoning process is applied to the image. Error diffusion, also indicated as "ED" in this document, is a well-established halftoning technique, especially suitable for printers that are able to produce dispersed dots, such as ink-jet printers.

Several error diffusion algorithms exist, that may be used for grey scale and for color. One way to extend an algorithm from grey scale to color is to apply the grey-scale algorithm separately on each color component.

In general, three methods exist to achieve a grey level in an image: area modulated printing, density modulated printing, and the combination of both. In area modulated printing, gray levels are achieved by applying a marking particle (such as ink or toner) to a smaller or larger area of a receiving substrate (such as paper). For ink-jet, this may be achieved by applying a larger quantity of ink, i.e. applying a larger drop size. In density modulated printing, grey levels are achieved by applying different types of marking particles to the receiving substrate, each type having a different density. For ink-jet, different ink densities (such as e.g. light cyan ink and dark cyan ink) may be used.

More background information on ED can be found in the following three patents, herein each incorporated by reference in their entirety for background information only.

U.S. Pat. No. 4,680,645 discloses multilevel error diffusion for a grayscale printing device using multiple drop sizes.

U.S. Pat. No. 5,975,671 discloses an error diffusion method for a printing device having multiple ink densities and dot sizes (or drop sizes); the ED levels are translated by a LUT (look-up table) to density/drop size combinations. More information on multilevel error diffusion in general can be found in this patent.

U.S. Pat. No. 5,963,714 discloses a multicolor and mixed-mode halftoning method, wherein a printer driver operates a printer capable of multiple dot-placement geometries or resolutions and multiple inks per color channel. The halftoning includes error diffusion.

In ordinary bilevel ED a gray value is quantized by means of thresholding. If the gray value is larger than the chosen threshold, the value is quantized to 1, otherwise it is quantized to 0. The quantisation error is distributed over neighboring unprocessed pixels. Therefore not the original pixel value is thresholded, but a modified pixel value which is equal to the original pixel value plus the quantization error the pixel has received from other, already processed, pixels. This feedback mechanism guarantees that the right mean tone value is produced.

In multilevel ED, the thresholding procedure is replaced by a more general quantization scheme.

The simplest quantization scheme is to quantize the modified pixel value to the nearest quantization level. The quantization error is once again fed to neighboring unprocessed pixels. The more quantization levels, the smaller the quantization error, and the better the quality of the ED image.

The multilevels are realized in practice in ink-jet printers by using inks of different densities, multiple drop sizes (in this document, the drop size is the amount of ink applied to a given pixel), or a combination of both. Error diffusion may also be applied to other printing techniques than ink-jet. Thus, in general, a level may be realized by a combination of a dot area (cf. the area modulated printing discussed above) and a dot density (cf. density modulated printing as discussed above). Some multilevel printing devices may provide such combinations wherein the dot area is kept constant; others may provide combinations wherein the dot density is kept constant; still others may provide combinations wherein both the dot area and the dot density may vary.

In case of a binary ink-jet printer using a light ink and a dark ink we can use a multilevel error diffusion with 3 levels: level 0=no drop of ink, level 1=a drop of light ink, level 2=a drop of dark ink.

Another example of an ink-jet printer with 6 levels: level 0=no drop of ink, level 1=a small drop of light ink, level 2=a medium drop of light ink, level 3=a large drop of light ink, level 4=a medium drop of dark ink, level 5=a large drop of dark ink.

While printing with multiple drop sizes is most often implemented in this way, printing with multiple ink densities is more often implemented by applying a set of inksplit curves, a set of lookup tables transforming each gray value into a set of gray values, one for each ink (e.g. light and dark ink). The thus obtained channels are processed independently by error diffusion algorithms to produce the output image channels. This method provides more control over how much light and dark ink is used to produce a certain tone value than the multilevel ED method. The inksplit method is chosen because the extra control on the ink quantities can be used to eliminate drying problems and image artifacts such as banding.

SUMMARY OF THE INVENTION

The present invention includes a method for processing a digitized continuous tone image for printing the image by a printing device, as claimed in independent claim 1. Preferred embodiments of the invention are set out in the dependent claims. Preferably, a method in accordance with the invention is implemented by a computer program. The invention also includes a system for carrying out such a method, and a computer readable medium including program instructions to carry out such a method. The invention further includes the printed material that is obtained by printing an image, obtained by such a method, on a receiving substrate.

In a preferred embodiment of the invention a multilevel ED algorithm is provided that allows to specify for each tone the fraction of pixels filled by each of the ED levels.

The specification may be made via a set of curves which may be hard-coded, read from file, specified by a user through a user interface.

One embodiment in accordance with the invention includes a computer program product for processing a digitized continuous tone image for reproducing said image by a printing device, wherein the image includes a plurality of pixels. The computer program product includes:

first program instructions for inputting a tone value of an input pixel of the image;

second program instructions for applying a plurality of levelsplit curves to said tone value, thus obtaining a plurality of level values, wherein each specific levelsplit curve out of said plurality of levelsplit curves corresponds to a level defined by (i) a combination of a dot density and a dot area, to be applied by said printing device to a receiving substrate for reproducing said image; or (ii) an overlap of a plurality of such combinations;

and wherein each specific levelsplit curve defines, for the tone value of the input pixel, which fraction of output pixels of the image when reproduced by the printing device is to be filled by the level corresponding to the specific levelsplit curve when reproducing the tone value;

third program instructions for inputting the plurality of level values to an error diffuser for obtaining an output pixel value of an output pixel for reproducing the image;

wherein a fraction of the output pixels that is to be filled by an overlap of levels depends on the level values and is independent of the error diffuser, the overlap of levels being an overlap of at least a first level and a second level, wherein the first level is a first combination of a first dot density and a first dot area and the second level is a second combination of a second dot density and a second dot area.

The computer program product may further include a computer readable medium wherein the first, second and third program instructions are recorded on the medium.

Another embodiment in accordance with the invention includes a computer program product for processing a digitized continuous tone image for reproducing the image by a printing device, wherein the image includes a plurality of pixels. The computer program product includes:

first program instructions for inputting a tone value of an input pixel of the image;

second program instructions for applying a plurality of levelsplit curves to the tone value, thus obtaining a plurality of level values, wherein each specific levelsplit curve out of the plurality of levelsplit curves corresponds to a level defined by a combination of a dot density and a dot area, to be applied by the printing device to a receiving substrate for reproducing the image, and wherein each specific levelsplit curve defines, for the tone value of the input pixel, which fraction of output pixels of the image when reproduced by the printing device is to be filled by the level corresponding to the specific levelsplit curve when reproducing the tone value;

third program instructions for inputting the plurality of level values to an error diffuser for obtaining an output pixel value of an output pixel for reproducing the image;

wherein a fraction of the output pixels that is to be filled by an overlap of a first level and a second level depends on the level values and is independent of the error diffuser; and wherein for each tone value a sum of the plurality of level values is at most equal to 100%.

The computer program product may further include a computer readable medium wherein the first, second and third program instructions are recorded on the medium.

Yet another embodiment in accordance with the invention includes a system for processing a digitized continuous tone image for reproducing the image by a printing device, wherein the image includes a plurality of pixels. The system includes:

a first input module for inputting a tone value of an input pixel of the image;

an applicator for applying a plurality of levelsplit curves to the tone value, thus obtaining a plurality of level values, wherein each specific levelsplit curve out of the plurality of levelsplit curves corresponds to a level defined by (i) a combination of a dot density and a dot area, to be applied by the printing device to a receiving substrate for reproducing the image; or (ii) an overlap of a plurality of such combinations;

and wherein each specific levelsplit curve defines, for the tone value of the input pixel, which fraction of output pixels of the image when reproduced by the printing device is to be filled by the level corresponding to the specific levelsplit curve when reproducing the tone-value;

a second input-module for inputting the plurality of level values to an error diffuser for obtaining an output pixel value of an output pixel for reproducing the image;

wherein a fraction of the output pixels that is to be filled by an overlap of levels depends on the level values and is independent of the error diffuser, the overlap of levels being an overlap of at least a first level and a second level, wherein the first level is a first combination of a first dot density and a first dot area and the second level is a second combination of a second dot density and a second dot area.

BRIEF DESCRIPTION OF THE DRAWINGS

The invention is described with reference to the following drawings without the intention to limit the invention thereto, and in which.

DETAILED DESCRIPTION OF THE PREFERRED EMBODIMENTS

In a preferred embodiment of the invention, a set of levelsplit curves is used, that define, for each tone value and each level, what fraction of the pixels will be filled by the different levels, i.e. what contribution the different levels make to reproduce a given tone value. In the case of a binary printer the set levelsplit curves may be the set of inksplit curves.

Figure 2:
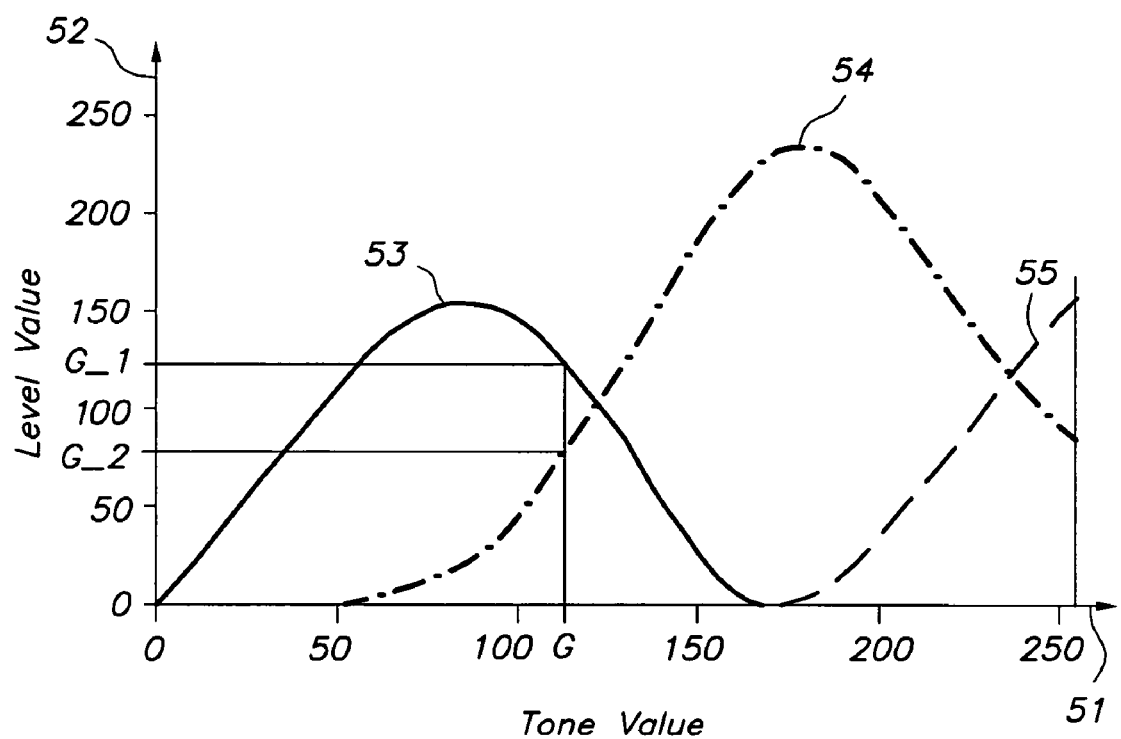
FIG. 2 shows a set of levelsplit curves as used by the embodiment of FIG. 1.

FIG. 2 shows an example of levelsplit curves for a printing system with three drop sizes (small, medium, large). In diagram 50, the horizontal axis 51 represents tone value, while the vertical axis 52 represents level value. Each tone value is transformed into a maximum of three level values in this example, as there are three levelsplit curves: curve 53 for the small drop size, curve 54 for medium drop size and curve 55 for large drop size. For example tone value G is transformed into level values G_1 and G_2.

In this drawing, the tone value and level values are in the range 0 to 255. They may of course also be in other ranges; they may also be scaled to the interval 0 to 1, or 0 to 100%, as is generally done in the description below.

These curves may be designed by a user with the help of a user interface, allowing to draw curves or to specify curves by changing a few numbers, such as the start and end point of the different curves, their maximal height, etc. Alternatively they may be generated by a computer program to optimize certain system properties such as grain, ink amount, banding artifacts, etc.

A levelsplit curve may also be given in the form of a table.

As discussed above, a level may be realized by a combination of a dot area, corresponding in ink-jet printing to an ink drop size, and a dot density, corresponding in ink-jet printing to an ink density.

Moreover, a level may also correspond to an overlap of at least two dot area/dot density combinations, as will now be explained.

Take again the example with 6 levels discussed above: level 0=no drop of ink, level 1=a small drop of light ink, level 2=a medium drop of light ink, level 3=a large drop of light ink, level 4=a medium drop of dark ink, level 5=a large drop of dark ink. This case may be represented by five levelsplit curves, for levels 1 to 5. We can avoid overlaps of the different levels on a single pixel, by keeping the sum of all curves smaller than or at most equal to one (i.e. 100%). In case we do want to allow for overlaps, we may achieve this in different ways.

In a first embodiment, the overlaps are defined as additional levels, and we will have a separate curve describing the contribution of such an additional level to the tone value. E.g. in the binary printer example discussed above we may have 4 levels instead of 3: level 0=no drop of ink, level 1=a drop of light ink, level 2=a drop of dark ink, and now additionally level 3=a drop of both light and dark ink on top of each other. We will need 3 levelsplit curves in this case.

In a second embodiment, we allow that the sum of the levelsplit curves is larger than 1. E.g. when at a particular tone value we have a contribution of 40% of level 1 and 70% of level 2, this will result in a 10% overlap of levels 1 and 2 (10%=40%+70%−100%).

In both these embodiments, it is possible to specify the exact amount of overlap between each of the levels. This is an additional advantage of using levelsplit curves. When using the classic inksplit curves with standard error diffusion, the overlap between drops of light ink and dark ink is not controlled entirely by the curves, but depends to a large extent on the details of the error diffusion process. Take for example a case with two inksplit curves, and suppose that for a given tone value, level$_1$=20% and level$_2$=20%. If now, for both levels, an ED algorithm is used that is sufficiently random (e.g. by providing enough noise, or by changing the threshold value in a random way), then the overlap of both levels will be 0.2×0.2=0.04=4%. If, on the other hand, for both levels identically the same error diffuser is used, without noise, then the same pixels will be set for both levels, so that the overlap will be 20%.

In a preferred embodiment of the invention, the error diffuser is such that the overlap of the levels on a given pixel is controlled by the levelsplit curves and is independent of the error diffuser. This offers the advantage of full control over the specific contributions of the levels to the tone, as well as full control over the overlap between different levels. Moreover, this control may be done outside of the error diffusion process. The overlap may be controlled for printing devices using only one drop size and inks of different densities, for printing devices using multiple drop sizes and an ink of one density, for printing devices using multiple drop sizes and inks of different densities.

The advantage of laying the full control of level usage outside of the error diffuser is that the error diffuser is far more adaptable to new situations, e.g. new printer type, new inks, new media, other application. It gives a user the possibility to rule out certain levels that may be responsible for certain artifacts such as banding. It offers the possibility to make other trade-offs between graininess and ink usage for different applications, without changing anything to the error diffusion algorithm.

Moreover, the percentage of white pixels may be controlled as well. It is equal to 1 minus the sum of the levelsplit curves, when expressed in the interval 0 to 1.

The levelsplit curves may be read from a file or even adapted interactively by a user of the ED.

In classical multilevel error diffusion, using a multilevel quantiser or multiple thresholds, use of the different levels and their overlaps is only controlled partially and indirectly via manipulation and randomisation of the thresholds, as illustrated already above by the example of the two inksplit curves.

Figure 1:
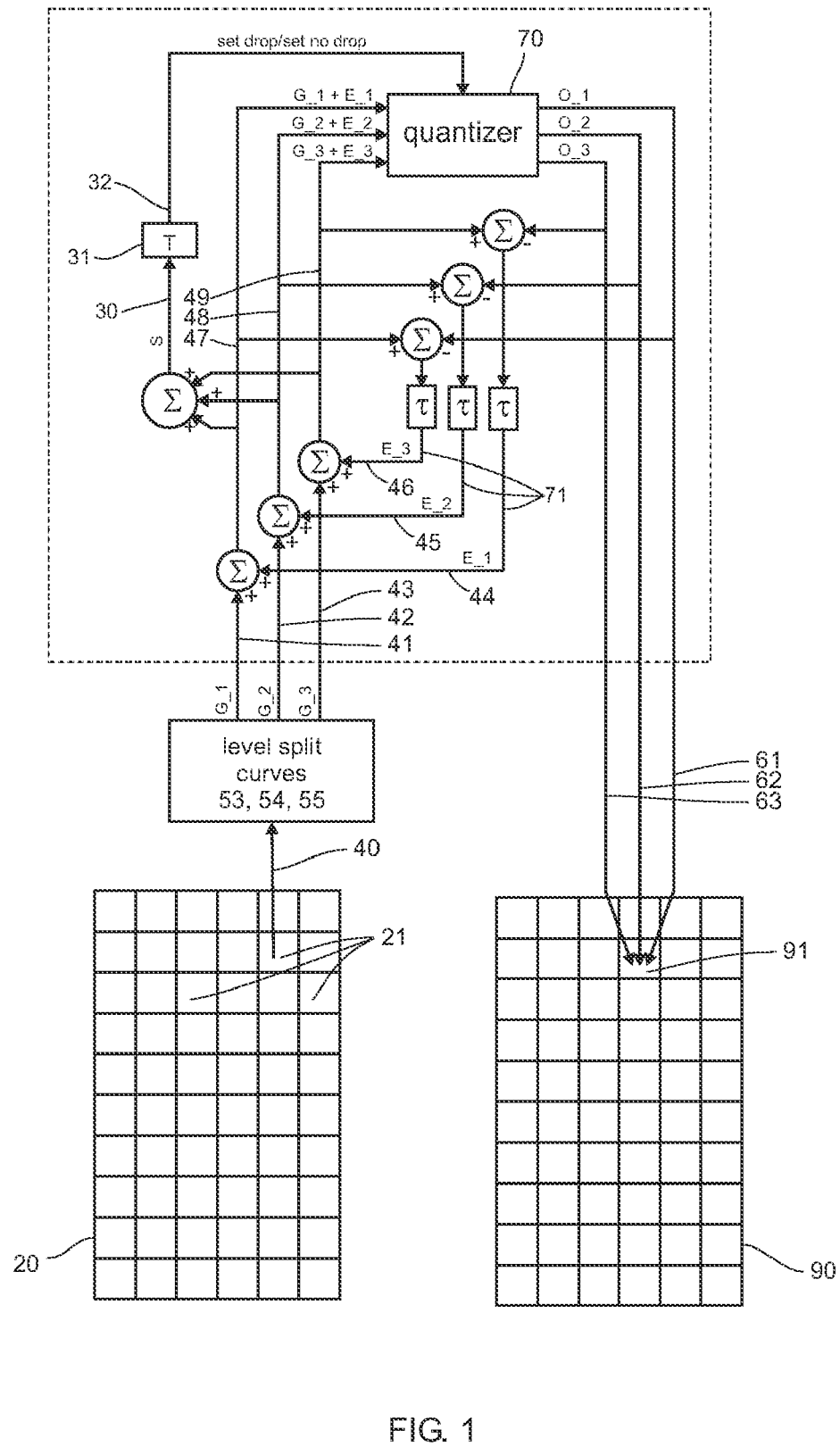
FIG. 1 diagrammatically shows an embodiment in accordance with the invention.

FIG. 1 shows a preferred embodiment 10 of the invention, wherein the ED algorithm using the levelsplit curves is as follows.

Suppose we have K levelsplit curves (i.e., K levels other than the one where no ink is applied; 53, 54, 55 in FIG. 1).

The input image 20 contains a plurality of input pixels 21. We scan the image, e.g., in a linewise manner.

For each encountered pixel 21, we perform the following steps:

Step 1: Transform the incoming gray value G (40 in FIG. 1) to K values G_1, . . . , G_K (41, 42, 43 in FIG. 1) by the levelsplit curves (53, 54, 55 in FIG. 1).

Step 2: Modify the values G_1, . . . , G_K (41, 42, 43 in FIG. 1) by adding the quantization errors (44, 45, 46) received from neighboring, previously processed pixels to obtain modified level values G_i +E_i (47, 48, 49 In FIG. 1) (this is feedback 71, performed by quantizer 70, in FIG. 1).

Step 3: Calculate the sum S (30 in FIG. 1) of the modified level values. G$_{13}$ i+E i (47, 48, 49 in FIG. 1).

Step 4: Find the channel i=imax having the largest value of the modified level values G_i (47, 48, 49 in FIG. 1).

Step 5: Quantization of the modified level values G_i+E i (47, 48, 49 in FIG. 1) yielding output values O_i (61, 62, 63 in FIG. 1): If the sum s is larger than the threshold T (reference 31 in FIG. 1).

O_i=1, for i=imax (i.e. set a drop; 32 in FIG. 1)

O_i=0, for all other i (i.e. set no drop of ink; 32 in FIG. 1)

Else

O_i=0, for all i

Step 6: Obtain quantization errors E i (44, 45, 46 in FIG. 1) for all K channels and diffuse them to neighboring unprocessed pixels.

When allowing sum values of levelsplit curves larger than 1, step 5 above will be replaced by:

Step 5': Quantization of the values G_i yielding output values O_i:

O_i=0, for all i

While S is larger than the threshold T

O_i=1, for i=imax

S is replaced by S−1

G_i is replaced by G_i−1

Find the channel i=imax having the largest value of G_i

When the sum of the levelsplit curves is smaller than 2 (=200%), the above while loop is performed no more than 2 times at most.

The quantized level values 61, 62, 63 are now used to set pixel 91 in output image 90.

Other embodiments of an ED algorithm that uses the levelsplit curves are as follows. Instead of using the sum S of pixel values, another function f (G_1, . . . , G_K) may be used. More specifically we may use a linear combination of the G_i, with minor adaptations to the algorithm outlined above.

Another possibility of changing the algorithm is to group certain levels together (e.g. all levels with a certain drop size, irrespective of their ink density). We can then replace the binary threshold T by a multilevel quantiser. In our example, the output of this quantiser will be No drop/A drop of Light Ink/A drop of Dark Ink/An overlap of Light and Dark Ink. The second quantiser will then decide over the size of the drop.

As discussed already above, in a preferred embodiment of the invention, the error diffuser is such that the overlap of the levels on a given pixel is controlled by the levelsplit curves and is independent of the error diffuser.

The following example illustrates this: with two different sets of levelsplit curves, the contributions of two levels to reproduce a given tone value are the same, but the overlap of the levels is different, while nothing is changed to the error diffuser. The first set of curves contains two curves, for levels $L_1$ and $L_2$, so that their sum is at most equal to 100% (these curves represent a combination of a dot density and a dot area, not an overlap). As explained before, the overlap is thus zero. The second set is based on the first set and contains three curves, as follows:

$L_{OV=Min\{L1,L2\}}$ (i.e., for each tone value, the value of $L_{OV}$ is the minimum value of $L_1$ and $L_2$)

$L'_{1=L1} - L_{OV}$ $L'_{2=L2} - L_{OV}$

For this second set, $L_{OV}$ gives the overlap of levels $L_1$ and $L_2$; this overlap is maximal.

It is also possible to specify that a particular overlap of two levels is to be zero, or that more overlaps, even all overlaps of all levels are to be zero; this may be advantageous with respect to drying (in these cases, a level means a combination of a dot area and a dot density, not an overlap of two or more of such combinations).

The present invention can be applied to black and white printing devices and to color printing devices. It is especially suitable for ink-jet printing, but may also be applied to other printing techniques (such as electrophotography). Also, white ink may be used, which may be together with a combination of other inks, e.g. CMYK inks, and possibly on a non-white (e.g. black) receiving substrate.

Those skilled in the art will appreciate that numerous modifications and variations may be made to the embodiments disclosed above without departing from the scope of the present invention.

LIST OF REFERENCE SIGNS

10: embodiment
20: input image
21: input pixel
30: sum
31: threshold
32: drop/no drop
40: tone value
41, 42, 43: level value
44, 45, 46 : error value
47, 48, 49: modified level value
50: diagram
51: axis
52: axis
53, 54, 55 : levelsplit curve
61, 62, 63 : output value
70: quantizer
71: feedback
90: output image
91: output pixel

What is claimed, is:

1. A method for processing a digitized continuous tone image for reproducing the image by a printing device, the image including a plurality of input pixels having pixel tone values, wherein for each input pixel the printing device renders a corresponding output pixel by printing a level out of a plurality of available levels defined by a combination of a dot size and dot density or an overlap of dot size and dot density, including a level for printing no dot, the method comprising the steps of:

a) defining for each of the available levels a levelsplit curve, each levelsplit curve defining over the range of input pixel tone values an average contribution of the level for rendering that input pixel tone value;

b) inputting a tone value of an input pixel of the image;

c) applying the levelsplit curves to the tone value for obtaining the average contributions for each of the available levels;

d) modifying the average contributions by adding to them diffused quantization errors obtained from a previous processing step to obtain modified average contributions;

e) calculating the sum of the modified average contributions;

f) if the sum does not exceed a threshold, selecting for the output pixel the level that corresponds to printing no dot;

g) if the sum does exceed the threshold, determining which of the modified average contributions has the greatest value, and selecting for the output pixel the corresponding level;

h) determining a quantization error between the modified average contributions and the contribution of the selected level;

i) diffusing the quantization error to the average contribution of at least one unprocessed input pixel;

j) printing the output pixels.

2. The method according to claim 1, further comprising the step of:

reading the plurality of levelsplit curves from a file.

3. The method according to claim 1, further comprising the step of:

inputting the plurality of levelsplit curves through a user interface.

4. The method according to claim 3, wherein at least one levelsplit curve of a level defined by an overlap of combinations of dot size and dot density is zero.

5. A system for reproducing a digitized continuous tone image, the image including a plurality of input pixels having pixel tone values, wherein for each input pixel the printing device renders a corresponding output pixel by printing a level out of a plurality of available levels defined by a combination of a dot size and dot density or an overlap of dot size and dot density, the system comprising:

means for inputting a tone value of an input pixel of the image;

at least one table including a plurality of levelsplit curves for converting an input tone value into an average contribution for each available level;

an adder for adding to the average contributions diffused quantization errors obtained from a previous processing step to obtain modified average contributions;

an adder for calculating a sum of the modified average contributions;

a comparator for determining if the sum is smaller or larger than a threshold;

a quantizer for selecting the level that corresponds to a maximum average contribution if the sum is larger than the threshold, and for selecting a level that corresponds with no dot if the sum is smaller than the threshold;

a subtracter for determining a quantization error between the modified average contributions and the contribution of the selected level; and a diffuser for diffusing the quantization error to the average contribution of at least one unprocessed input pixel.

6. A system according to claim 5, further comprising a printer.

7. A system according to claim 6, wherein the printer is an inkjet printer.

8. A computer readable medium storing a computer program, when the computer program is executed on a computer, the computer program performs a method for processing a digitized continuous tone image for reproducing the image by a printing device, the image including a plurality of input pixels having pixel tone values, wherein for each input pixel the printing device renders a corresponding output pixel by printing a level out of a plurality of available levels defined by a combination of a dot size and dot density or an overlap of dot size and dot density, including a level for printing no dot, the method comprising the steps of:

a) defining for each of the available levels a levelsplit curve, each levelsplit curve defining over the range of input pixel tone values an average contribution of the level for rendering that input pixel tone value;

b) inputting a tone value of an input pixel of the image;

c) applying the levelsplit curves to the tone value for obtaining average contributions for each of the available levels;

d) modifying the average contributions by adding to them diffused quantization errors obtained from a previous processing step to obtain modified average contributions;

e) calculating a sum of the modified average contributions;

f) if the sum does not exceed a threshold, selecting for the output pixel the level that corresponds to printing no dot;

g) if the sum does exceed the threshold, determining which of the modified average contributions has the greatest value, and selecting for the output pixel the corresponding level;

h) determining a quantization error between the modified average contributions and the contribution of the selected level; and i) diffusing the quantization error to the average contribution of at least one unprocessed input pixel.

9. The computer readable medium according to claim 8, wherein the method further comprises the step of:

reading the plurality of levelsplit curves from a file.

10. The computer readable medium according to claim 8, wherein the method further comprises the step of:

inputting the plurality of levelsplit curves through a user interface.

11. The computer readable medium according to claim 8, wherein the method further comprises the step of:

printing the output pixels.

* * * * *